United States Patent [19]

Woodhead et al.

[11] Patent Number: 5,640,388
[45] Date of Patent: Jun. 17, 1997

[54] METHOD AND APPARATUS FOR REMOVING JITTER AND CORRECTING TIMESTAMPS IN A PACKET STREAM

[75] Inventors: Douglas F. Woodhead; Maynard D. Hammond, both of Lawrenceville; Richard A. Powers; Paul Rimas Zalkauskas, both of Cumming, all of Ga.

[73] Assignee: Scientific-Atlanta, Inc., Norcross, Ga.

[21] Appl. No.: 576,637

[22] Filed: Dec. 21, 1995

[51] Int. Cl.$^6$ .................................................. H04L 12/56
[52] U.S. Cl. .......................... 370/468; 370/516; 348/464
[58] Field of Search ........................... 370/60.1, 61, 17, 370/94.2, 94.1, 60, 100.1, 105.3, 103, 108, 84, 112, 79; 375/355, 371, 372; 348/464, 497, 500, 536, 537, 512, 518

[56] References Cited

U.S. PATENT DOCUMENTS

| | | | |
|---|---|---|---|
| 4,894,823 | 1/1990 | Adelmann et al. | 370/60 |
| 5,115,431 | 5/1992 | Williams et al. | 370/94.1 |
| 5,287,182 | 2/1994 | Haskell et al. | 348/500 |
| 5,467,342 | 11/1995 | Logston et al. | 370/17 |
| 5,521,927 | 5/1996 | Kim et al. | 370/94.2 |
| 5,533,021 | 7/1996 | Branstad et al. | 370/94.2 |
| 5,543,853 | 8/1996 | Haskell et al. | 348/497 |
| 5,559,999 | 9/1996 | Maturi et al. | 370/94.2 |

OTHER PUBLICATIONS

"MPEG-2 Systems" Standard, Generic Coding of Moving Pictures and Associated Audio:Systems International Organisation for Standardisation ISO/IEC JTC1/SC29/WG11 Nov. 1994.
Wasilewski, A., "The MPEG-2 Systems Specification: Blueprint for Network Interoperability", Jan. 3, 1994.

*Primary Examiner*—Douglas W. Olms
*Assistant Examiner*—Chau T. Nguyen
*Attorney, Agent, or Firm*—Banner & Witcoff, Ltd.

[57] ABSTRACT

In a system that transmits packets containing timestamps and information from a transmission site to a reception site at a transmission bit rate the packets may experience jitter, i.e. variable delay, during transmission. In such a case, the packets are temporally shifted relative to the timestamps and to other packets. Where the timestamp values are inserted into selected packets prior to transmission and that timestamp represent the value of the transmission site clock, the method and apparatus of the present invention substantially removes the jitter and adjusts the timestamp values prior to reception of the packets at the reception site. The present invention achieves this goal by receiving the packets at an intermediate site that has a local clock operates at a nominal frequency substantially equal to the nominal frequency of the transmission site clock and uses that clock as a jitter-free clock to correct the packets. The packets are stored in a buffer at the intermediate site and output from the buffer at a controlled rate to maintain a substantially constant average transit time of packets through the buffer. Before the packets are output for reception at the reception site the timestamps of selected packets are modified to reflect the new temporal relationship between packets due to the controlled rate of output from the intermediate site.

10 Claims, 9 Drawing Sheets

METHOD AND APPARATUS FOR REMOVING JITTER AND CORRECTING TIMESTAMPS IN A PACKET STREAM

FIELD OF THE INVENTION

The present invention relates to digital transmission systems, and more particularly, to a method and apparatus for removing jitter from transmitted packets subjected to uncorrected variable delays, and for correcting timestamps in selected packets to accurately reflect the temporal location of selected packets relative to other packets.

BACKGROUND OF THE INVENTION

The International Organization for Standardization (ISO) adopted a standard protocol for combining one or more "elementary streams" of coded video, audio or other data into a single bitstream suitable for transmission. The standard, hereinafter referred to as the "MPEG-2 Systems" standard, is described in detail in the MPEG-2 Systems Committee Draft (ISO/IEC JTC1/SC29/WG11 N0801, November, 1994) [hereinafter "MPEG-2 Systems Committee Draft"], which is hereby incorporated by reference. An overview of the MPEG-2 Systems standard is provided in Wasilewski, *The MPEG-2 Systems Specification: Blueprint for Network interoperability* (Jan. 3, 1994), which is also hereby incorporated by reference. The MPEG-2 Systems standard provides a syntax and set of semantic rules for the construction of bitstreams containing a multiplexed combination of one or more "programs." A "program" is composed of one or more related elementary streams. An "elementary stream" is the coded representation of a single video, audio or other data stream that shares the common timebase of the program of which it is a member. For example, in the context of a subscription television system, a program may comprise a network television broadcast consisting of two elementary streams: a video stream and an audio stream.

As development of the MPEG-2 Systems standard progressed, a two-level packet-based multiplexing scheme emerged. At the first level, each elementary stream to be transmitted, i.e., the coded data for one video, audio or other data stream, is packetized to form a Packetized Elementary Stream (PES). Each PES packet in a given Packetized Elementary Stream consists of a PES packet header followed by a variable length payload containing the coded data of that elementary stream. The Packetized Elementary Stream structure provides a mechanism for packaging subparts of a longer elementary stream into consecutive packets along with associated indicators and overhead information used to synchronize the presentation of that elementary stream with other, related elementary streams (e.g., elementary streams of the same program).

At the second level, one or more Packetized Elementary Streams may be further segmented or "packetized" to facilitate combining those streams into a single bitstream for transmission over some medium. Ultimately, two different second level protocols for combining one or more Packetized Elementary Streams into a single bitstream emerged: 1) the Program Stream (PS) protocol and 2) the Transport Stream protocol. Both stream protocols are packet-based and fall into the category of transport layer entities, as defined by the ISO Open System Interconnection (OSI) reference model. Program Streams utilize variable-length packets and are intended for error-free environments in which software parsing is desired. Program Stream packets are generally relatively large (1K to 2K bytes). Transport Streams utilize fixed length packets and are intended for transmission in noisy or errored environments. Each Transport Stream packet comprises a header portion and a payload portion. Transport Stream packets have a relatively short length of 188 bytes and include features for enhanced error resiliency and packet loss detection. The remaining background discussion will focus primarily on the MPEG-2 Transport Stream protocol. Each group of Transport Stream packets that contain the same elementary stream data are assigned the same unique Packet ID (PID). For example, the elementary stream containing the coded video data for a network television program may be assigned a PID of "10"; the elementary stream containing the associated audio data for that program may be assigned a PID of "23," and so on.

As finally adopted, the Transport Stream protocol provides a standard format (i.e., syntax and set of semantic rules) for combining one or more Packetized Elementary Streams into a single Transport Stream that may then be transmitted over some medium. FIG. 1 graphically illustrates the generation of an MPEG-2 Transport Stream from a plurality of Packetized Elementary Streams. As illustrated, the individual packets of each Packetized Elementary Stream are segmented and inserted into the payload sections of successive Transport Packets. For example, as illustrated in FIG. 1, one of the PES packets 10 of the Packetized Elementary Stream containing the coded video of elementary stream "Video 1" is segmented and inserted into the payload sections of consecutive Transport Packets, e.g. 12 and 14. Every Transport Packet has a header, e.g., header 16 of Transport Packet 12, and the header of each Transport Packet contains the PID associated with the Packetized Elementary Stream carried in that Transport Packet. In the example illustrated in FIG. 1, the Packetized Elementary Stream carrying the coded video of elementary stream "Video 1" has been assigned a PID of "10," and therefore, the header of each Transport Packet 12, 14 carrying data from that Packetized Elementary Stream will contain a PID value of "10." Similarly, the headers of each Transport Packet 18, 20 carrying Packetized Elementary Stream data for elementary stream "Audio 1" will contain the PID assigned to that elementary stream, which in the example shown is "23."

The Transport Packets formed from each Packetized Elementary Stream are then multiplexed to form a single outgoing bitstream or Transport Stream. Thus, a Transport Stream comprises a continuous sequence of Transport Packets, each of which may carry data from one of a plurality of Packetized Elementary Streams. At a decoder location, a given Packetized Elementary Stream can be recovered from the incoming Transport Stream by simply extracting every incoming packet whose header contains the PID assigned to that Packetized Elementary Stream. A group of related Packetized Elementary Streams (e.g. audio, video etc.) can be extracted to reproduce a complete program.

As the MPEG-2 Systems standard developed, the MPEG-2 Systems Committee further decided that segmentation of each Packetized Elementary Stream into a respective sequence of Transport Packets is to be carried out by an encoder at the transmission site employing a common system clock that operates at a nominal frequency of 27.0 MHz. Decoders for receiving and presenting a selected program (i.e., a set of related elementary streams) will therefore need a corresponding system clock whose frequency of operation and absolute instantaneous value match those of the encoder. However, in practice, a decoder's free-running system clock frequency will rarely, if ever, match the encoder's system clock frequency exactly, and therefore, some method for synchronizing the decoder system clock with the encoder system clock is required. As the MPEG-2 Systems standard developed, participants of the MPEG-2 Systems Committee suggested that synchronization of a decoder's system clock with the encoder's system clock (sometimes also referred to hereinafter as "clock recovery") be achieved through the use of timestamps, referred to in the MPEG-2 Systems Committee Draft as Program Clock References. A Program Clock Reference (PCR) is an actual "snapshot" of a counter connected to the encoder's system clock. According to the technique adopted, for each program carried in a given Transport Stream, PCR's must be generated at least once every 100 ms and inserted into the Transport Packets carrying one of the elementary streams that make-up that program. For example, as illustrated in FIG. 1, PCRs 24 and 26 have been inserted into Transport Packets 12 and 14, which carry Packetized Elementary Stream data for the video elementary stream, "Video 1," of "Program 1." Similarly, PCRs, e.g. PCR 28, have been inserted into the Transport Packets, e.g. packet 32, carrying Packetized Elementary Stream data for the video elementary stream, "Video 21," of "Program 21."

As mentioned, for a given program, PCRs must be generated and inserted into the sequence of Transport Packets carrying one of the elementary streams of that program at least once every 100 ms. Each PCR is an actual snapshot of a counter connected to the encoder system clock at the time the PCR was inserted into its respective Transport Packet, and therefore, the original PCRs inserted into the Transport Packets of a given program reflect the true timebase of that program. With such a timestamp approach, each program may have its own independent timebase, and therefore, there is no need to synchronize the timebases of different programs prior to multiplexing.

Although the PCRs in the sequence of Transport Packets carrying Packetized Elementary Stream data for a given program represent the true timebase of the program prior to any multiplexing stages, the MPEG-2 Systems Committee realized that as the Transport Packets for each elementary stream reach the Transport Stream multiplexer 22, certain packets may experience a variable delay during multiplexing since the multiplexer can only send one packet at a time. When a PCR bearing Transport Packet experiences a variable delay, the original PCR in that packet is no longer valid. Consequently, the Transport Stream multiplexer 22 must adjust the original PCR to account for any variable delay imposed on that packet by the multiplexer. Note, however, that constant end-to-end delays will not invalidate the PCRs in a series of Transport Packets since each Transport Packet will experience that same constant delay.

One way to adjust the PCR value in a packet that experiences a variable delay, and the method ultimately adopted by the ISO, is to determine the amount of variable delay the packet experiences between the input and output of a multiplexer or other device, and then to add that delay time to the original PCR value as the packet leaves the device in the outgoing Transport Stream. As a result of this adjustment, the PCR's of a given program, no matter where they may appear in an outgoing Transport Stream, should reflect the absolute value of the encoder's system clock at the time the packets bearing those PCR's were inserted into the outgoing Transport Stream.

FIG. 2 illustrates the need for adjusting PCR values to account for variable delays, such as multiplexing delays. As illustrated in FIG. 2, two Transport Packet sequences, each formed from a different Packetized Elementary Stream, are provided to respective inputs of a Transport Stream multiplexer 22. One sequence of Transport Packets, e.g. packets A and B, carries the Packetized Elementary Stream data of an exemplary video elementary stream, "Video 3." The other sequence of Transport Packets, e.g. Packets C and D, carries the Packetized Elementary Stream data of an exemplary audio elementary stream, "Audio 7." As further illustrated, Transport Packets A and B in the sequence of packets for "Video 3" contain Program Clock Reference values, $PCR_A$ and $PCR_B$, respectively. As explained above, each of the timestamps is a "snapshot" of the encoder system clock at the time the PCR was inserted into its respective Transport Packet of the sequence. Accordingly, a series of PCRs carried in the sequence of Transport Packets formed from a particular Packetized Elementary Stream reflect the actual timebase of the single program of which that Packetized Elementary Stream is a member.

Still referring to FIG. 2, assume that Transport Packets A, B and C of the respective Transport Packet sequences for "Video 3" and "Audio 7" exit the Transport Stream multiplexer in the order A - C - B, as illustrated. In such a case, Transport Packet B has been delayed relative to Transport Packet A by an amount, $\Delta T_M$. Consequently, the original timestamp, PCRB, in Transport Packet B will no longer accurately reflect its relation in time to Transport Packet A. To compensate for such multiplexing delays or other variable delays, the MPEG-2 Systems Committee suggested that the PCR of any Transport Packet that experiences such a delay be adjusted to account for the delay. As noted above, however, in situations where all packets experience a same constant delay, no adjustment of the PCRs is necessary. However, it is unlikely in most situations that all packets will experience an exactly constant delay.

The adjustment of a PCR to compensate for a variable delay is illustrated in FIG. 2. As shown, the original PCR of Transport Packet B has been replaced with an adjusted value, $PCR_B{}'$. The adjusted timestamp value, $PCR_B{}'$, is obtained by adding the value of the delay, $\Delta T_M$, to the original timestamp value, $PCR_B$. Thus, $PCR_B{}' = PCR_B + \Delta T_M$.

At a reception site, a decoder can be used to select one of the programs carried in an incoming Transport Stream for output or presentation at the reception site. The PCR's carried in the Transport Packets of a single selected program can be used to slave the decoder's system clock to the encoder's system clock for purposes of decoding that program. That is, the PCRs can be used to recreate or re-establish the timebase of that single program as the Transport Packets carrying the elementary stream data for that program arrive at the decoder. Stated generally, the PCRs may be used to perform clock recovery in the decoder.

FIG. 3 illustrates a model decoder for use in selecting a given program for output at a reception site. In accordance with the timestamp technique described above, a clock generation circuit 58 in the decoder processes the PCR values carried in the Transport Packets of a selected program in order to re-establish the timebase of the selected program for decoding purposes. According to the model, an MPEG-2 Transport Stream is received by the decoder 40 and provided to a Transport Stream demultiplexer/parsing unit 42. A user's program selection is provided to the de-multiplexer 42 via line 44. When a user selects a given program for output, the de-multiplexer 42 begins extracting every incoming Transport Packet having a PID that matches one of the PIDs assigned to the elementary streams that make-up the selected program. For example, referring back to FIG. 1, a subscriber may select "Program 1" which consists of elementary streams "Video 1" and "Audio 1." Transport Packets carrying the Packetized Elementary Stream data for "Video 1" each have a PID of "10," and the Transport Packets carrying the Packetized Elementary Stream data for "Audio 1" each have a PID of "23." As successive packets of the Transport Stream are received, the de-multiplexer 42 will extract every incoming Transport Packet having a PID of "10" or "23." Extracted Transport Packets will then be parsed in order to reassemble the original Packetized Elementary Streams. Ultimately, the coded video and audio data of each Packetized Elementary Stream will be provided to respective buffers 48, 54, and then to respective decoders 50, 56 which decode the data to produce analog video and audio signals for output to a display device.

Additionally, as each Transport Packet of the selected program is received, the de-multiplexer 42 determines whether that Transport Packet contains a PCR. If so, the PCR is extracted from the incoming packet and provided to the clock generation circuit 58 via line 59. As explained above, it is highly unlikely that the frequency of a decoder's system clock will be exactly the same as that of the original encoder, or that the decoder's system clock will be perfectly stable (i.e, will not drift). In accordance with the timestamp approach described herein, the PCR values, which are sent periodically in the Transport Packets of the selected program, can be used to reproduce or recover the encoder system clock in the decoder, i.e., the PCRs can be used to re-establish the timebase of the selected program. Recovery of the encoder system clock in the decoder is performed by a clock generation circuit 58. FIG. 3 illustrates a model clock generation circuit that may be used in accordance with the timestamp technique described above.

The model clock generation circuit 58 of FIG. 3 implements a digital closed-loop control that is similar to a phase-lock-loop except that the reference and feedback terms are numbers (e.g., the values of counter 66 and received PCRs). Upon initial acquisition of a user selected program, the counter 66 is loaded via line 61 with the first PCR received for that program. Thereafter, the clock generation circuit essentially operates as a closed loop. A voltage controlled oscillator (VCO) 64 having a nominal frequency substantially equal to that of the encoder system clock provides the decoder system clock signal. As the decoder system clock runs, the clock signal increments counter 66 which therefore represents the absolute time of the decoder system clock. As shown, the value of counter 66 is continuously fed back to a subtractor unit 60. Subtractor 60 compares the counter value with subsequent PCRs as they arrive in the Transport Stream Packets. Since a PCR, when it arrives, represents the expected value of the decoder system clock at the time that PCR is received, the difference between it and the value of counter 66 may be used to drive the instantaneous frequency of the VCO 64 to either slow down or speed up the decoder clock signal, as appropriate. A low-pass filter and gain stage (LPF) 62 is applied to the difference values from the subtractor 60 to produce a smooth control signal for the VCO 64. As can be appreciated, the continuous feedback provided by counter 66 and the periodic arrival of PCR values in the Transport Stream will ensure that the decoder system clock remains slaved to the encoder system clock. Thus, for the selected program, the encoder system clock has been reproduced or recovered in the decoder, i.e., the original timebase of the single selected program has been re-established.

Applicants have realized that although the PCRs of each program must be adjusted during packet multiplexing to compensate for packet delays, some network devices that packets encounter during transmission will not institute the method described above to adjust the packets for variable delay. For example, Applicants have concluded that standard network transmission systems that incorporate packet multiplexing, such as ATM, would tend to change the temporal location of the Transport Stream packets in relation to their PCRs. In other words, Transport Packets flowing through such switches will arrive at their destination "jittered" with respect to their PCRs. A packet is "jittered" when that packet has had a temporal shift with respect to other packets in the same stream or with respect to its timing information. In the MPEG-2 context, a "jittered" Transport Packet is one that has experienced some variable delay with respect to another packet in the Transport Stream or with respect to its PCR, such that the PCRs no longer accurately reflect the timebase of a Program.

As Applicants have recognized, in systems that introduce jitter to the Transport Stream packets, there is a need for a method and apparatus for removing or adjusting for such jitter, and for correcting timestamp values carried in those packets before those packets are presented to a decoder. Applicants reviewed all currently available systems for removing jitter in digital communications systems and concluded that no presently available technique could correctly remove the jitter from the Transport Stream packets.

One prior art system of removing jitter, which Applicants have found to be unsuccessful in the MPEG-2 context, employs a technique of monitoring buffer fullness. According to that technique, packets are placed in a buffer and output from the buffer at a rate designed to keep the buffer fullness constant. By setting the buffer fullness to a predetermined level and controlling the output rate to maintain fullness of the buffer at that level, the clock of a transmission system is substantially tracked by a reception system. However, such buffer fullness techniques are effective only in constant transmission bit rate systems where the data should be delivered from the transmission site to the reception site at a constant rate. In a variable bit rate system, the data cannot be assumed to be delivered to the reception site from the transmission site at a constant rate. In a variable transmission bit rate system, such as an MPEG-2 system, the buffer fullness will change when the transmission bit rate changes and thus, the buffer fullness technique fails in such a system.

Thus, there is a need for methods and apparatus for removing jitter from packet streams, such as an MPEG-2 Transport Stream, in systems that include variable bit rate transmission. The present invention satisfies this need.

SUMMARY OF THE INVENTION

The present invention is particularly well suited for use in systems that transmit packets of information from a transmission site to a reception site wherein timestamp values are inserted into selected packets prior to transmission in order to facilitate clock recovery at a reception site, and wherein the timestamp values in each packet may require adjustment to compensate for variable delays (i.e., jitter) experienced during multiplexing and/or transmission before reception at a reception site. Such systems include, for example, those that operate in accordance with the MPEG-2 Systems Specification.

According to a preferred embodiment of the present invention, the method comprises several steps. First, the packets are received at an intermediate site prior to reception at their ultimate destination. Second, the received packets are stored in a buffer at the intermediate site. Third, the packets are output from the buffer at a controlled rate for reception at the ultimate reception site. Simultaneously, the output rate of the packets is controlled by keeping a measure of the transit time of packets through the buffer and adjusting the output rate so that the average transit time of packets through the buffer remains substantially constant.

According to the presently preferred embodiment, the measure of transit time through the buffer is accomplished by obtaining an indication of the time the packet entered the buffer; obtaining an indication of the time the packet is output from the buffer; and, subtracting the entry time from the output time. While the time of an individual packet through the buffer may vary, a goal of the invention is to ensure that the average time of packet transit through the buffer remains constant. Accordingly, the individual packet transit times are filtered to remove short-term variations, and the output rate of packets from the buffer is adjusted to keep the average transit time constant. An apparatus according to the present invention, which implements the foregoing method, is referred to herein as a dejitter device.

According to another aspect of the present invention, the packets contain timestamps that have been corrupted as a result of the packets experiencing jitter, and which must therefore be corrected to accurately reflect the temporal location of the packets after dejittering is performed. This correction comprises the steps of: receiving the packets at an intermediate site before reception at the ultimate destination; storing the packets in a buffer at the intermediate site; obtaining an indication of the nominal transmission bit rate of the packets; outputting the packets from the buffer initially at the nominal transmission bit rate for reception at the reception site; measuring the transit time of packets through the buffer; determining a ratio $\alpha$ of transmission site clock frequency to a local (i.e., intermediate site) clock frequency for correcting local clock values to the transmission site clock values; modifying the timestamps contained in the packets using the local clock corrected by $\alpha$; and, simultaneously controlling the output rate so that the average transit time through the buffer remains constant.

According to the presently preferred embodiment, the steps of determining the ratio $\alpha$ of the transmission site clock frequency to the local clock frequency comprises the steps of: initializing with the ratio $\alpha$ to a predetermined value; filtering the average transit times of packets through the buffer to produce an indication of the relative difference between the transmission site clock and the local clock and adjusting the ratio based on that relative difference. By keeping a ratio $\alpha$ that tracks the relative frequency difference between the transmission site clock and the local clock, the local clock can remain free-running with respect to the transmission site clock. Thereafter, local clock values at the intermediate site can lock to the transmission site clock by multiplying intermediate site clock values by $\alpha$. This technique, as opposed to physically adjusting the local clock frequency to lock to the transmission site clock, allows a single intermediate site local clock to track multiple transmission site clocks.

According to another aspect of the preferred embodiment, the timestamps in the packets output from the intermediate site are corrected based on the local clock. Specifically, as the packets are output, the first timestamp of a given program remains unaffected; however, subsequent time stamps are changed by adding the time between the output of the last packet and the time of output of the current packet; correcting the resulting time by the ratio $\alpha$; and adding that corrected resulting time to the previously output packet's timestamp.

Another aspect of the present invention adjusts the output rate to track the timestamps that were in the stream of packets when the packets arrived at the intermediate site. Prior to entering a jitter introducing network, the timestamps in a stream accurately reflect the temporal location of those packets within the stream relative to the clock at the site from which they were transmitted. According to the present invention, the calculated timestamps that are placed in the packets output from the buffer are compared to the original timestamps of each packet, respectively. The difference between the calculated and original timestamps represents an error in the output rate. The output rate is adjusted to minimize this error. Thus, by continuously checking the calculated timestamps against the original timestamps, the intermediate site more closely tracks the pre-jitter transmission stream.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 2:
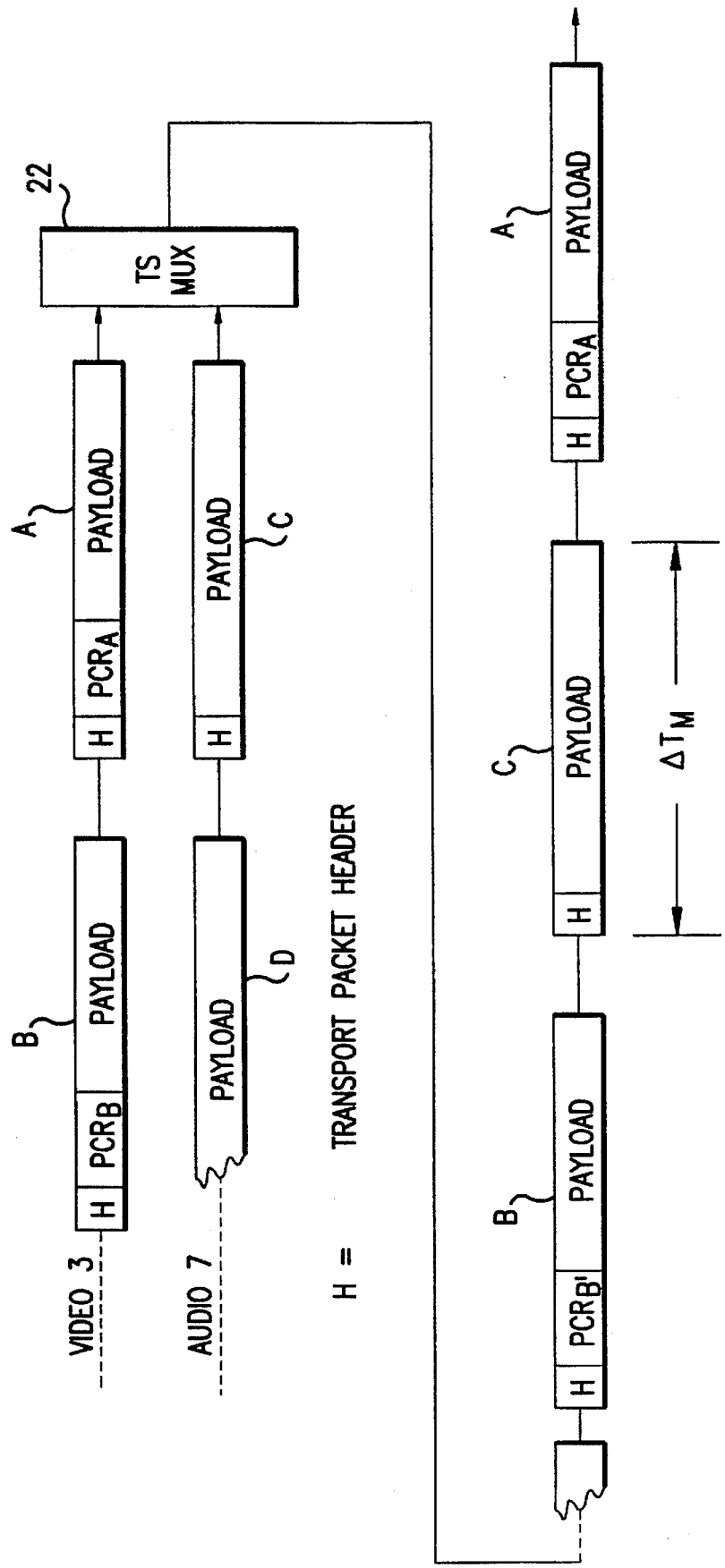
FIG. 2 illustrates the concept of timestamp adjustment to account for multiplexing delays in a packet-based communications system.

Referring now to the drawings, FIG. 2 depicts Transport Streams travelling through a multiplexer 22 wherein they are combined into a single Transport Stream. As explained above, in order to provide accurate timebase recovery during reception of a transmitted program, the PCR values carried in the Transport Packets must be adjusted at every multiplexing stage in the transmission system to compensate for any multiplexing delays imposed by a multiplexer. Whenever a multiplexing stage or other device that adheres to the MPEG-2 standard imposes a variable delay on the Transport Packet, a value representing the magnitude of the delay is added to the current value in the PCR segment. Each multiplexing stage or other device will have a local system clock operating at a nominal frequency of 27.0 MHz, the nominal frequency of the encoder's clock 117. The delay, $\Delta T_M$, imposed upon the Transport Packet at a given multiplexing stage or other device may be calculated as follows:

$$\Delta T_M = LSCR(t_{out}) - LSCR(T_{in}) - D$$

where $LSCR(t_{out})$ is the value of the local system clock of the multiplexer when the Transport Packet reaches the output of the multiplexer;

$LSCR(t_{in})$ is the value of the local system clock when the Transport Packet enters the multiplexer; and D is a pre-determined constant delay that is imposed on all Transport Packets as they pass through the multiplexer. Once calculated, the measured delay, $\Delta T_M$, may be added to the current value of the PCR segment.

As Applicants have recognized, Transport Streams may travel through networks that implement a transmission standard different from the MPEG-2 standard. In these networks the Transport Packets may experience multiplexing that causes the packets to experience variable delay. However, because the transmission standard does not comply with the MPEG-2 standard, the PCRs within those Transport Packets will remain uncorrected for the variable delay. When the packets emerge from such a network they may be temporally shifted relative to the PCR values inserted by the encoder clock 117, i.e., the packets may be jittered.

Figure 4:
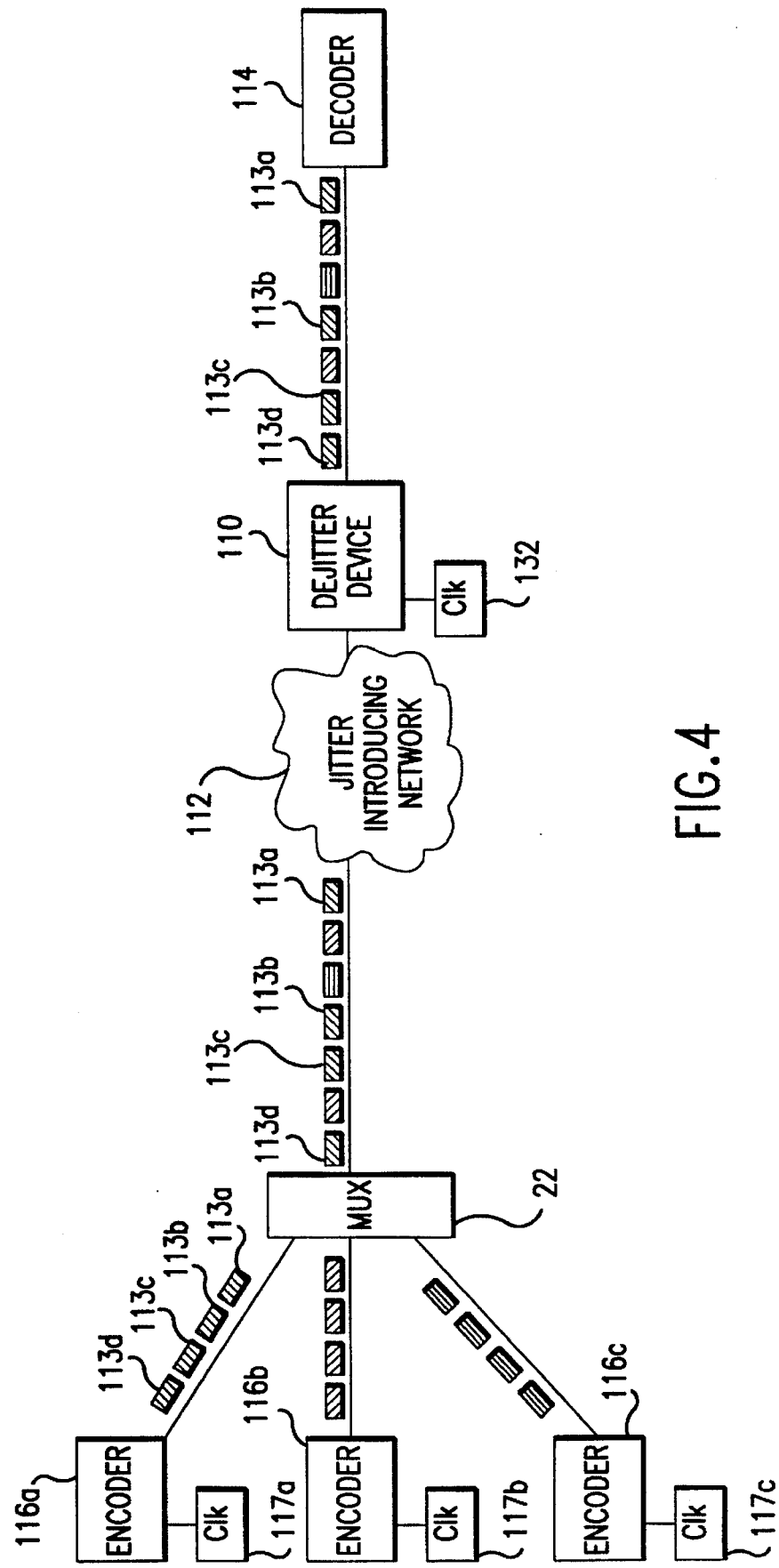
FIG. 4 illustrates an MPEG-2 system with a jitter introducing network in the transmission path and a dejitter device in the transmission path in accordance with the present invention.

This jittering of the Transport Packets is illustrated by following the Transport Packets through a typical travel path. FIG. 4 shows an exemplary multiplexed packet based communication system in which the present invention may be employed. The system of FIG. 4 operates in accordance with the MPEG-2 Systems standard. However, the present invention is by no means limited thereto.

Figure 3:
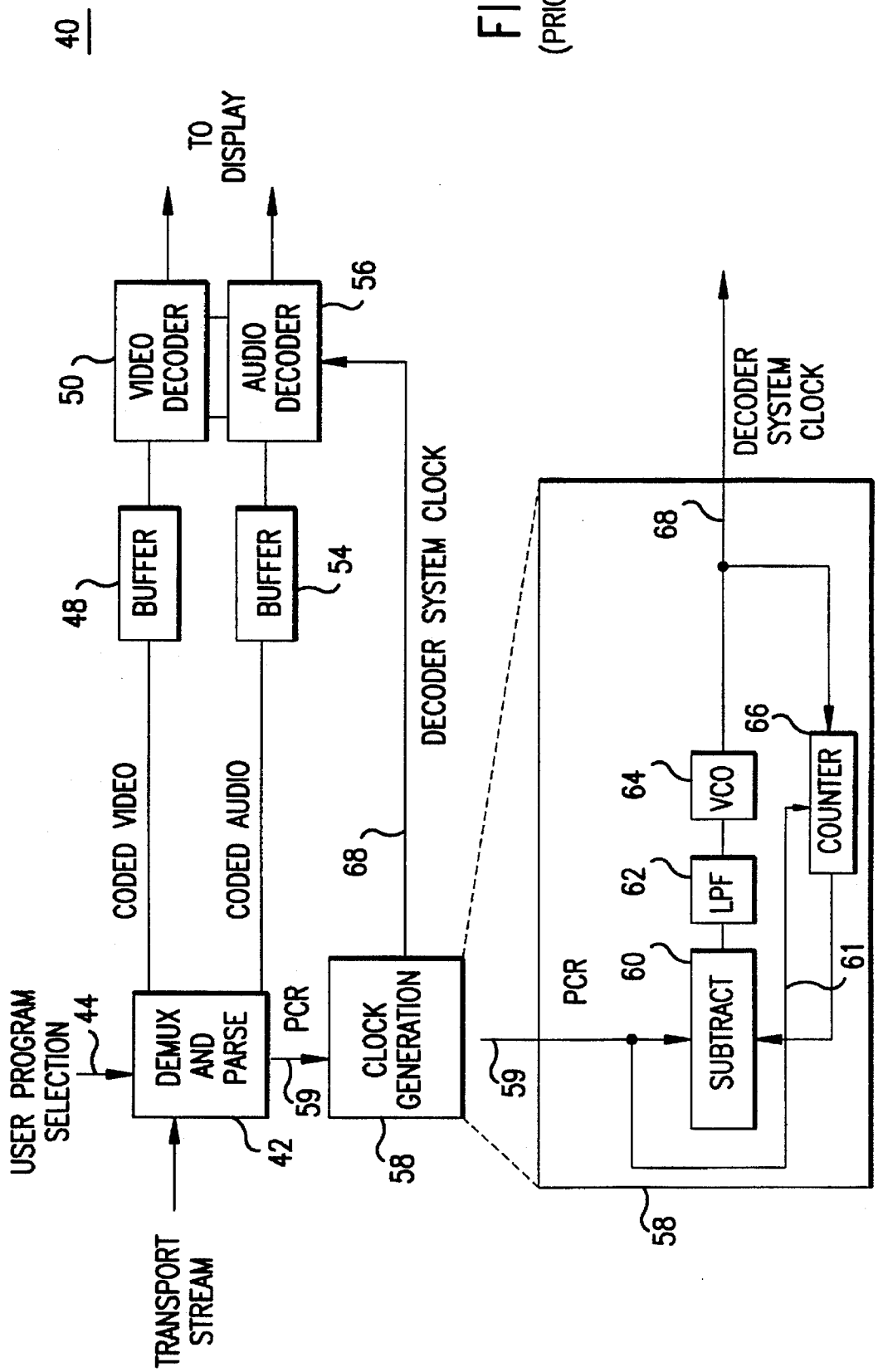
FIG. 3 is a block diagram of an exemplary decoder for recovering a selected program from an incoming Transport Stream.

As illustrated in FIG. 4, a plurality of encoders 116 each generate a series of Transport Packets containing the elementary streams of a given program in accordance with the MPEG-2 Systems Specification. Using the output from encoder 116a as a typical example, the Transport Packets 113a, 113b, 113c, 113d leave encoder 116a destined for the decoder 114 at a constant transmission bit rate of, for example, 1 Mbit/second. For simplicity, only PCR bearing packets are shown, it being understood that many packets in a stream may not carry timestamps. Ideally, the distance between the packets 113 is constant and the PCR bearing packets accurately reflect the timebase of the program generated by encoder 116a. However, the encoder system clock 117a from which the encoder 116a derives its timing will drift due to a variety of factors. As a result of that drift, there will remain small fluctuations in the relative distances between packets. Moreover, if the clock on the device receiving the packets is free-running, that clock will have its own drift. If uncorrected, the two clocks drifting relative to one another will be perceived as small rate variations to the receiving device. This relative drift is labelled as $\alpha$ on FIG. 7, and will essentially drift around 27 MHz, the nominal frequency of MPEG-2 system clocks. Because the receiving device can measure the frequency of its own clock, if the actual frequency of the encoder clock 117a including the drift variation is tracked by the receiving clock, the packets can be adjusted for $\alpha$ and the distance between the packets will once again appear constant. One technique for removing $\alpha$ is by using the digital closed loop circuitry illustrated in FIG. 3, and described above. Such a device works well when the receiving device can adjust its own frequency to match that of the encoder clock 117a. However, such a device cannot work when a multitude of encoder clocks 117a, 117b, 117c must all be tracked simultaneously by a single reception device clock because each clock will have its own $\alpha$ relative to the reception device clock.

Figure 8:
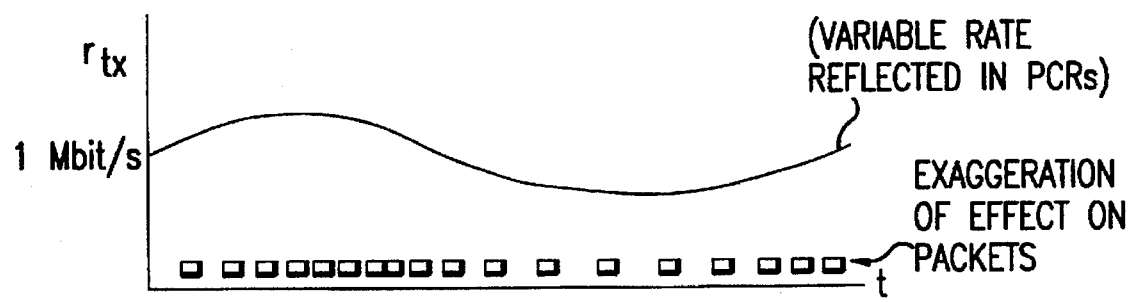
FIG. 8 graphically depicts the variable rate changes experienced by packets during the pre-jittered stage and its effect on the temporal location of packets.

Another factor, other than $\alpha$, contributes to a perceived transmission rate variation by a reception device. Multiplexers encountered along the transmission path introduce variable delay. One such multiplexer 22 is illustrated in FIG. 4. The packets 113a, 113b, 113c, 113d converge upon the multiplexer 22 along with Transport Packets from encoders 116b, 116c and so on. After the packets 113a, 113b, 113c, 113d emerge from the multiplexer 22, the distance between each packet may have temporally shifted relative to their pre-multiplexed temporal relationship. As illustrated in FIG. 4, Transport Packets from other encoders 116b, 116c will be interleaved with the encoder 116a packets. For example, two additional packets have been inserted between packet 113 a and packet 113b, and one additional packet has been inserted between packet 113c and packet 113d. As illustrated in FIG. 8, to a receiving device it will appear as though the packets were transmitted at a variable transmission bit rate. In the example of encoder 116a, the packets 113a, 113b, 113c, 113d appear to vary around 1 Mbit/second. However, through properly adjusted PCRs, a receiving device can track the transmission bit rate changes and reconstruct the timebase of the program. As will be explained more fully below, the PCRs contain the information necessary to reconstruct the rate as illustrated in FIG. 8.

Figure 9:
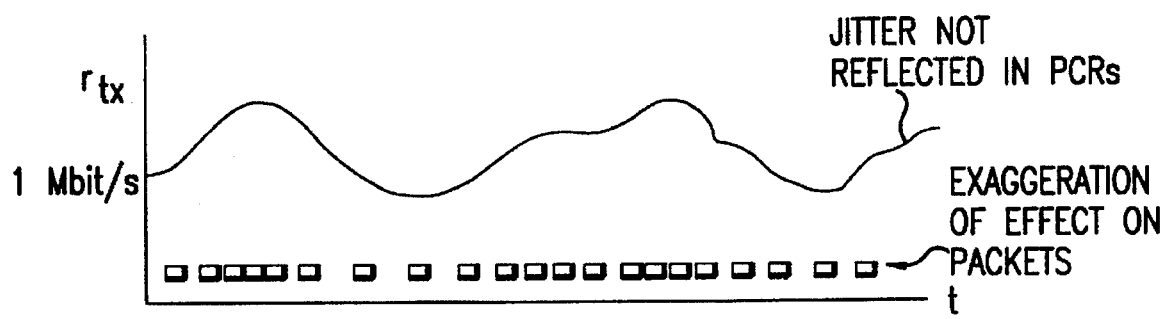
FIG. 9 graphically depicts the effect of jitter on the perception of transmission rate and its effect on the temporal location of packets.

When a jitter introducing network 112 is introduced to the system between the encoder 116a and the decoder 114, the temporal relationship between packets will be affected. As illustrated in FIG. 9, to a reception device this jitter will again appear to vary the transmission rate. This jitter presents a problem in that the jitter introducing network 112 does not adjust the PCRs in the packets to reflect the changes in temporal location of the packets, and therefore, the PCR values are no longer valid. If this jitter is uncorrected and is outside of the constraints of the decoder 114, the program cannot be recovered.

Figure 10:
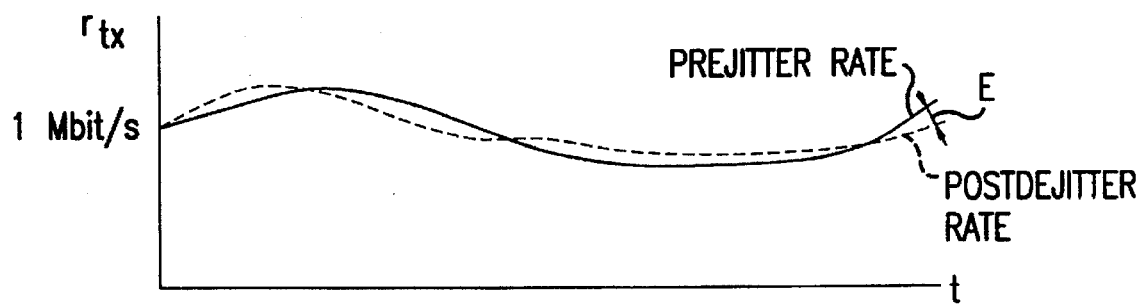
FIG. 10 graphically compares the pre-jittered variable transmission rate to the post dejittered variable transmission rate.

Accordingly, the present invention substantially removes the jitter from the packets and then adjusts the PCRs to accurately reflect the temporal location of packets after jitter is removed. The present invention inserts a dejitter device 110 at an intermediate site, between the jitter introducing network 112 and the decoder 114, to accomplish this goal of removing jitter from the packets and adjusting the timestamps before the packet reach the decoder 114. Specifically, the dejitter device 110 attempts to restore the packets to the approximate pre-jitter introducing network 112 temporal relationship. For example, the pattern at which the encoder 116a packets entered the jitter introducing network 112 should be reestablished as nearly as possible. FIG. 10 illustrates an example of the transmission bit rate of the packets as they exit the dejitter device 110 versus the transmission bit rate of the packets before they enter the jitter introducing network 112. As shown, the post dejitter transmission bit rate will closely track the pre-jitter transmission bit rate. However, there will remain a small error, $\epsilon$, between the two transmission rates. As will be described in detail below, the present invention tracks $\epsilon$ to constantly adjust the resulting output transmission bit rate in order to minimize $\epsilon$.

Accordingly, the dejitter device 110 accepts jittered packets and outputs dejittered packets. Specifically, the dejitter device 110 receives a Transport Stream from the jitter introducing network 112; tracks the drift, $\alpha$, of the encoder clocks 117 to provide a jitter-free local clock reference; filters the jitter through a low-pass filter to remove it; outputs the packets to track the pre-jitter introducing network transmission bit rate; and corrects the transmission bit rate for error $\epsilon$ in transmission bit rate. As a result, the packets output from the dejitter device 110 should approximate the packets as they entered the jitter introducing network 112. However, the packets experience de-multiplexing and re-multiplexing within the dejitter device 110. As a result, the order of packets exiting the dejitter device 110 may change. For example, as illustrated in FIG. 4, as the packets exit the dejitter device 110, one packet has been inserted between 113$b$ and 113$c$; whereas, prior to entering the jitter introducing network 112 no packets came between them. However, the packets now accurately reflect the correct temporal relationship to other packets in the stream and such minor discrepancies, as illustrated, will not affect the operation of the decoder 114.

Figure 1:
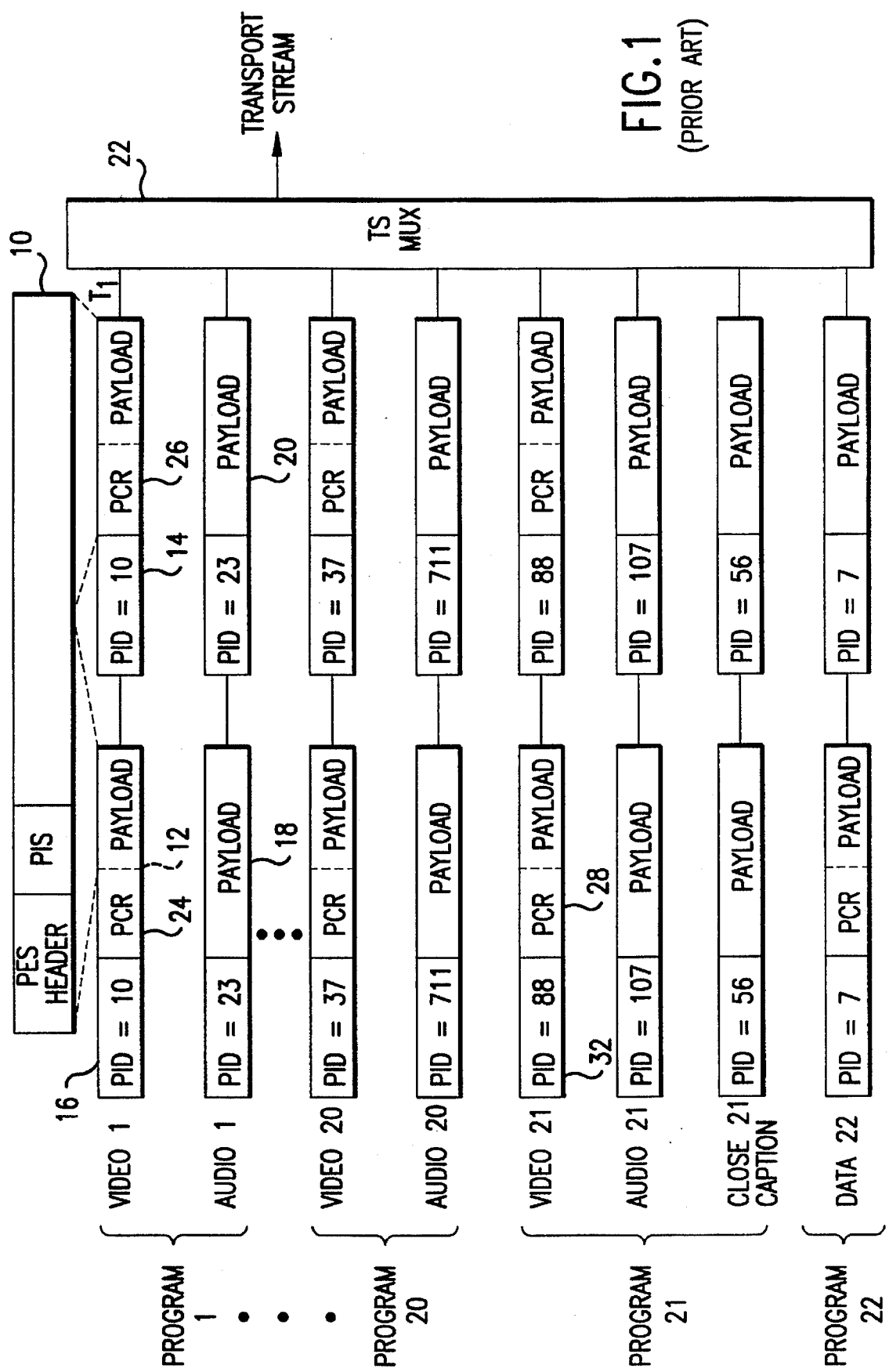
FIG. 1 illustrates the generation of a Transport Stream from a plurality of Packetized Elementary Streams in an encoder.

As can be appreciated from FIGS. 1 and 4, a single Transport Stream is a multiplexed combination of Transport Packets representing a variety of programs, each potentially generated by a different encoder 116. Typically, each encoder 116 will employ its own system clock 117 that is used to establish the timebase of programs generated by that encoder. Although each encoder system clock 117 is nominally running at 27.0 MHz, each will still experience some drift relative to the clocks 117 of the other encoders 116. Therefore, because the dejitter device 110 modifies the PCRs in the Transport Packets, and the PCR of a particular packet must be set relative to the clock 117 of the encoder 116 that generated the data within that packet, the dejitter device 110 of the present invention must be able to track the clock of each encoder 116$a$, 116$b$, 116$c$ separately. Moreover, each encoder 116 may have a different transmission bit rate. For example, while encoder 116$a$ may transmit at a transmission bit rate of 1 Mbit/second, encoder 116$b$ may transmit at 2 Mbit/second. The dejitter device 110 must therefore separately track the transmission bit rates of each encoder 116.

Figure 6:
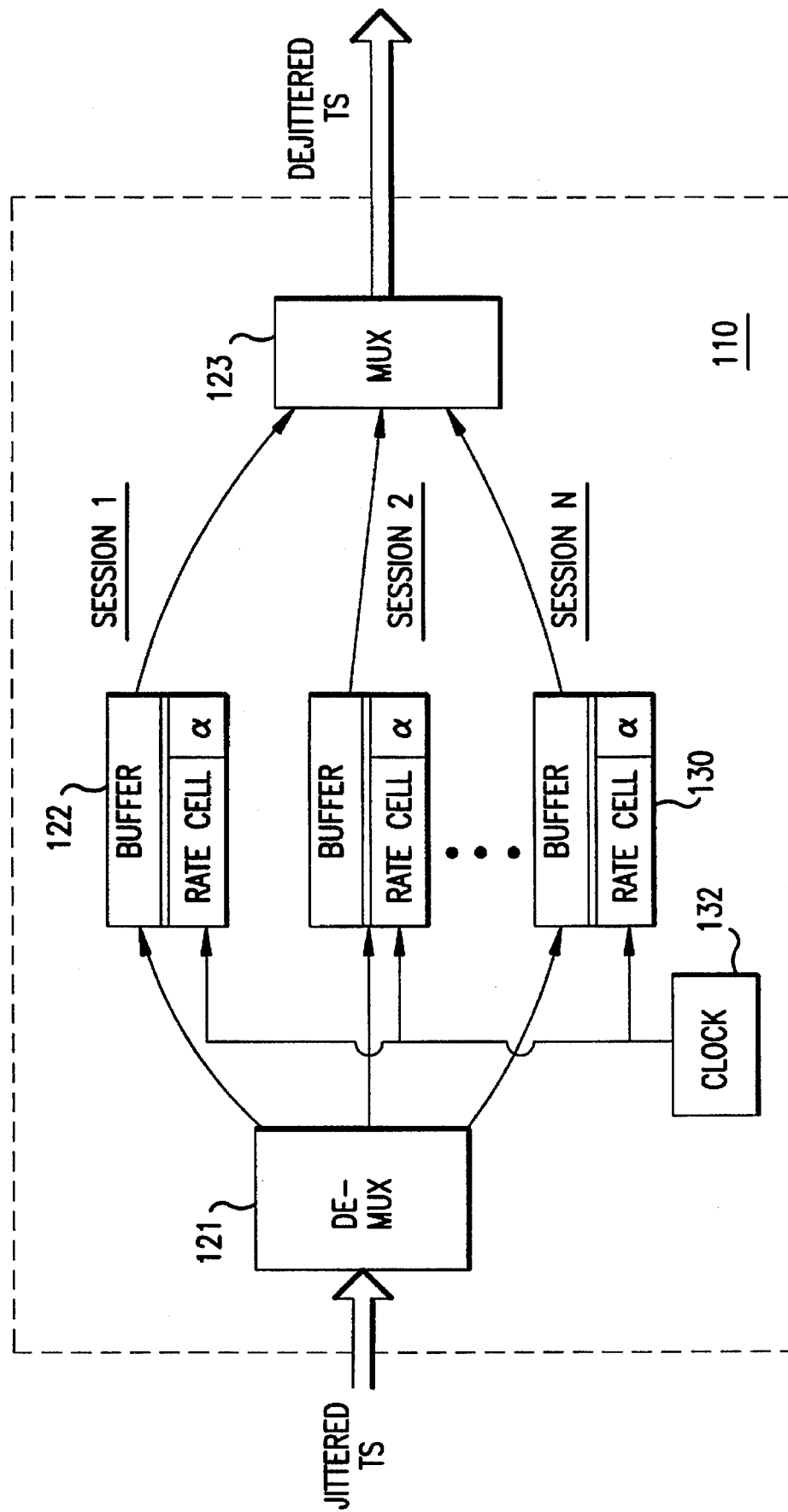
FIG. 6 illustrates the functional division of the dejittering process on a per session basis.

Referring to FIG. 6, the present invention achieves these goals by essentially de-multiplexing the Transport Stream into constituent sessions which represent all of the program information transmitted from a particular encoder 116 related to a single program. When the Transport Stream is received by the dejitter device 110, the different sessions are de-multiplexed at point 121; the dejittering is performed and PCR adjustments are made on each session individually; the sessions are then re-multiplexed at point 123 as they exit the dejitter device 110. The dejitter device 110 has a single local clock 132 that is used as a reference for each session. Because the dejitter device 110 has a single clock 132, the MPEG-2 standard clock locking mechanism of FIG. 3 cannot be used. Rather, as will be described in detail below, the dejitter device 110 tracks the $\alpha$ of each encoder 116 and maintains an $\alpha$ for each session individually. The $\alpha$ for each session is then used as a coefficient to correct calculations involving the local clock 132 for that session.

In order for the dejitter device 110 to track the various sessions, the dejitter device 110 is provisioned with information. This provisioning information communicates to the dejitter device 110 which group of PIDs should be treated together as a single session and what the nominal transmission bit rate is for a given session. Referring to the program examples of FIG. 1, the dejitter device 110 is provided with information that allows it to associate PIDs "88,""107," and "56" to a single session, which in this example represents "Program 21." This provisioning information is kept in a table of valid PIDs. Thereafter, as a Transport Packet is received, the dejitter device 110 examines the packet PID, determines the appropriate session for the packet, and stores that packet together with other packets that have PIDs belonging to the same session. Moreover, this provisioning information also communicates to the dejitter device 110 a nominal transmission bit rate for each session. Thus, for example, the dejitter device 110 is provisioned with the information that the Transport Packets comprising "Program 21" will be transmitted at a nominal transmission bit rate of 1 Mbit/second. As will be described more fully below, the nominal transmission bit rate for a session is used to initialize a rate cell 130 for that session.

Figure 5:
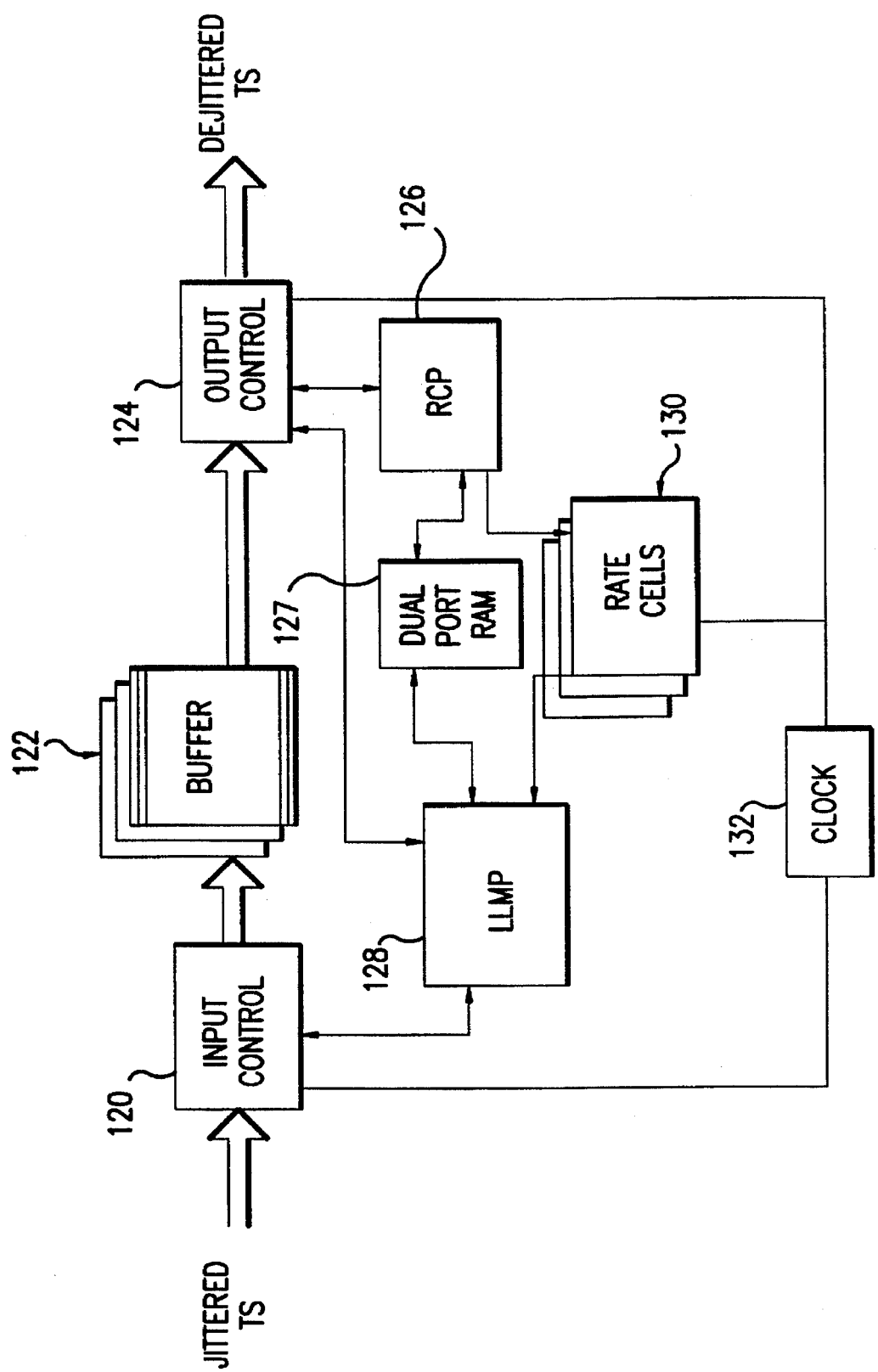
FIG. 5 illustrates a block diagram of the flow of data and control in the dejitter device of FIG. 4 in accordance with the present invention.

Referring now to FIG. 5, the dejitter device 110 of the present invention comprises eight functional blocks. First, input control logic 120 receives the packets. Second, a buffer 122, implemented in DRAM, stores the packets. Third, output control logic 124 outputs packets from the buffer 122 at a controlled rate and re-multiplexes the Transport Packets of each program to form a new Transport Stream. Fourth, rate cells 130 control the rate at which packets are output from the buffer. The rate cells 130 are a group of registers, one for each session, that continuously count down from the value loaded into the register. When a rate cell 130 reaches its terminal count a connection number is passed to the Linked List Management Processor 128. Fifth and Sixth, two processors, Rate Control Processor (RCP) 126 and Linked List Management Processor (LLMP) 128, control the buffer storage and implement the dejitter method of the present invention. The RCP 126 and LLMP 128 functions can be implemented in any suitable microprocessors. According to the presently preferred embodiment, both the RCP 126 and the LLMP 128 utilize an Advanced Micro Devices 29030 RISC processor running at 25 MHz. Seventh, a dual port RAM 127 positioned between the RCP 126 and the LLMP 128 allow the two processors to communicate such information as nominal transmission bit rate and valid PID numbers for a session. And eighth, a local clock 132 provides a local clock reference for the dejitter device 110.

The internal operation of the dejitter device 110 will now be described in further detail with reference to FIG. 5. Initially, the dejitter device 110 receives, at the input control logic 120, Transport Packets from a single Transport Stream. Input control logic 120 interfaces the dejitter device to the transmission medium that handles low-level timing and control while assembling packets in a first-in first-out fashion. After the input control logic has assembled a complete packet, it notifies the LLMP 128. Subsequently, the LLMP 120 looks at the PID of the packet and compares the packet to a table of valid PID values. This table contains the PID values of all valid sessions and is part of the provisioning information supplied to the dejitter device 110, as described above. If the PID value of the received packet is contained in the table, that PID is considered valid, and the method of the present invention proceeds.

After the PID is validated, the LLMP 120 stores the packet in a buffer 122 by linking the packet, in a conventional linked list, with a list of other received packets of the same session. As each received packet is linked to its respective session, the LLMP 120 maintains, along with the packet, other information needed by downstream processes. For example, the time the packet entered the buffer 122 is stored along with the packet. Additionally, when the packet contains a PCR, the LLMP 120 also stores, along with the packet, a count of the number of packets in the Transport Stream that were received between this packet and the most recent previous PCR bearing packet with the same PID.

The buffer 122 must be sufficiently sized to prevent an overflow or underflow. If the buffer 122 overflows, packets that should be stored will be discarded because of insufficient buffer space. If the buffer underflows, not enough packets will have been stored. Consequently, packets will not be output when they are due because the buffer is empty. Moreover, the MPEG-2 Systems Specification requires that PCRs be sent every 100 ms. Because at least two packets with PCRs must be stored to allow for proper timing of output in accordance with the present invention, the 100 ms time between PCR packets must be accounted for in sizing the buffer. A minimum buffer size for each session can thus be determined by:

$$\text{Buffer}_{min} = (2 * \text{Delay}_w + 100 \text{ ms}) * r_{max}$$

where,

Delay$_w$ is the worst case transit time that a packet may experience in travelling from the encoder 116 through the network to the dejitter device 110 during transmission. This value must be determined empirically;

$r_{max}$ is the maximum nominal transmission bit rate of packets.

Multiplying by the number of sessions gives an approximation of the overall minimum buffer size. Size efficiencies can be gained by dynamically reallocating buffer space between lower and higher rate sessions.

The RCP 126, in cooperation with the rate cells 130, controls the output rate of packets from the buffer 122. To achieve this control, the RCP 126 initially sets the rate cell 130 for a given session to the nominal transmission bit rate that was provisioned to the dejitter device 110. Thereafter, the RCP 126 continuously adjust the value set into the rate cell 130 to track α and ε. The rate cell 130 then repeatedly counts down to a terminal count based on its set value provided by the RCP 126. Each time a rate cell 130 for a particular session reaches its terminal count, it notifies the LLMP 120 that a packet is due to be output. When notified that a packet is due to be output, the LLMP 120 places a packet into output control logic 124, which adjusts the PCRs in the selected packets that contain PCRs and ensures that the packet is properly output. As the rate cells 130 notify the LLMP 120, and the LLMP 120 places the packets in output control logic 124 in the order of notification from the rate cells 130, the packets from all sessions are essentially re-multiplexed as a single Transport Stream.

As noted above, the RCP 126 subsequently adjusts the output rates to compensate for differences between the local clock 132 and the encoder 116 clocks, i.e., adjusts the output rate based on an α. The local clock 132 provides clocking information to all the subcomponents of the dejitter device 110 at the nominal frequency of 27.0 MHz. Differences between an encoder clock 117 and the local clock 132 will be reflected in packet transit time through the buffer 122. For example, if the local clock 132 is slower than the encoder clock 117 then the packet transit times through the buffer will increase. This clock difference can be minimized by continuously adjusting the value set into the rate cell 130, which, as explained above, controls the rate at which the packets of a given session are output from the buffer.

Output control logic 124 consists of an interface to the transmission medium that also handles low-level timing and control. Before a packet is output by control logic 124, the RCP 126 provides the output control logic 124 with a modified PCR in accordance with another aspect of the present invention described more fully below. The output control logic 124 inserts the modified PCR in place of the original PCR of the packet before the packet is output.

Typically, PCRs will only be associated with a single PID for a given session. Thus, although packets are stored (i.e., linked) on a per session basis, when keeping track of the PCRs, a per PID basis is used. That is, referring back to the example of "Program 21," only the "Video 21" packets contain PCRs. Neither the "Audio 21" nor the "Close Caption 21" packets contain PCRs. Thus, although the PCRs are contained only in a single PID stream, they are related to the clock of the encoder 117 for all packets of that same session and, as will be explained more fully below, will be useful in dejittering all packets of the same session. After packets are linked in sessions, the dejitter device 110 effectively operates on each session independently to correct the jitter. When the individual sessions are dejittered, the session streams are output from the buffer 122 and re-multiplexed to create a new Transport Stream.

Figure 7:
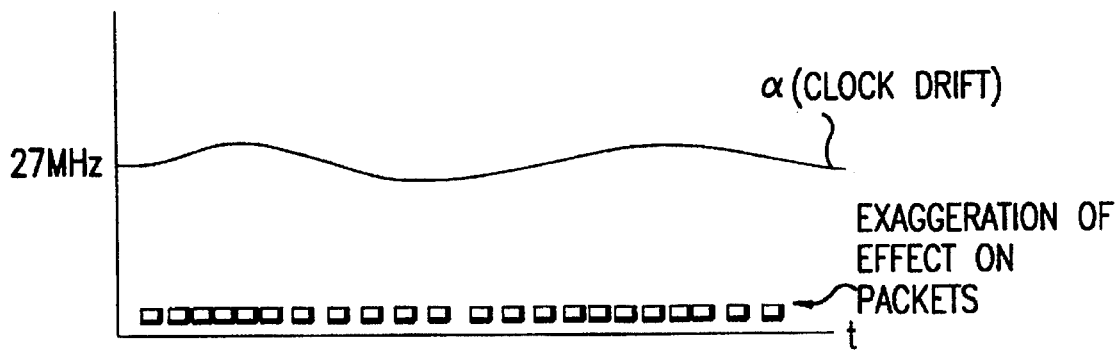
FIG. 7 graphically depicts the relative drift of the encoder clock and a reception site clock over time and its effect on temporal location of packets.

According to the present invention, in order to dejitter the packets of a particular session, the packets need to be output from the dejitter device 110 at substantially the same transmission bit rate at which they were generated by the encoder 116 as modified by the pre-jitter multiplexer 122. Moreover, the encoder clocks 117 drift relative to the dejitter device local clock 132, i.e., by an amount represented by α, as illustrated in FIG. 7. In order to ensure accurate output of the packets from the dejitter device 110, α must be estimated and the dejitter device local clock 132 must closely track, i.e., be locked to the encoder clock 117. This is accomplished in the present invention by passing the packets through buffer 122 and controlling their output so that the transit time of each packet of the session through the buffer remains substantially constant. By controlling the rate at which packets are output from the buffer, such that the average transit time of packets through the buffer remains substantially constant, jitter is effectively removed.

As mentioned above, the present invention uses α because a single session cannot lock the frequency of the clock, but rather, the clock must be shared among a plurality of sessions. In the present embodiment, the dejitter device 110 contains a single local clock 132. Therefore, the rate of this local clock 132 cannot itself be changed to track a single encoder clock 117; otherwise, the dejitter device local clock 132 would lock to the clock of one encoder 116 but remain unlocked with respect to the clocks of other encoders 116. Rather, the dejitter device 10 tracks the clock of each encoder 117 through a separate rate cell 130 and a separate clock coefficient, α, while leaving the dejitter device local clock 132 free-running with respect to all the clocks of all encoders 116. In particular, the dejitter device 110 assumes that each session was created by a different encoder 116 and tracks the encoders 116 on a per-session basis. The coefficient α is updated in real time to track the relative drift between the dejitter device local clock 132 and the clock of each encoder 117; whereas, the rate cell 130 is used to track the output rate of packets from multiplexer 22 for packets of a given session.

Considering a particular session, the encoder 116 that created the packets of that session and the dejitter device 110 both have clocks running at substantially the same nominal frequency. However, there will inevitably be a small variation in frequency between the two clocks that must be factored into the dejittering process of the present invention. This small variation is determined through $\alpha$. As indicated above, $\alpha$ represents the ratio of the frequency of the dejitter device local clock 132 to the frequency of the encoder clock 117. Alternately, $\alpha$ can be expressed as a ratio of encoder clock 117 ticks to the dejitter device local clock 132 ticks relative to some point in time and can be represented in equation form by:

$$\alpha = \frac{f_{encoder}}{f_{dejitter}}$$

or, $$\alpha = \frac{ticks_{encoder}}{ticks_{dejitter}}$$

Ideally, the encoder clock 117 and the dejitter clock 132 are identical and perfectly stable. Thus, $\alpha$ should be very close to one. However, due to a variety of factors, the two clocks will drift relative to one another and this drift must be tracked by $\alpha$ in real time.

There may be an equivalent variety of available methods to compute $\alpha$ in real time. The presently preferred embodiment tracks $\alpha$ by tracking the average transit time of packets through buffer 122. More specifically, as each packet is stored in buffer 122, the value of the dejitter device local clock 132 is stored. When the same packet is output from buffer 122, the value of the dejitter device local clock 132 is again stored. Using these clock count values, a time through the buffer can be determined for the nth packet according to:

$$\Delta T_n = DCR(t_{exit\ n}) - DCR(t_{entry\ n})$$

where, $DCR(t_{exit\ n})$=The value of the dejitter clock at the time when the nth packet was output from the buffer;

$DCR(t_{entry\ n})$=The value of the dejitter clock at the time when the nth packet was stored in the buffer.

These transit times through the buffer can then be used to calculate $\alpha$. The calculation assumes that the encoder clock 117 and the dejitter device local clock 132 are nearly identical, so that the ratio between them should be very close to one. Any difference between the two clocks will show up as a change in the average transit time through the buffer. If the dejitter device local clock 132 is faster than the encoder clock 117 then the average transit time through the buffer will decrease as the dejitter device 110 empties buffer 122 faster than the encoder 116 can fill it. Alternately, if the dejitter device local clock 132 is slower than the encoder clock 117, then the average transit time through the buffer 122 will begin increasing as the encoder 116 fills the buffer 122 faster than the dejitter device 110 can empty it. Hence, $\alpha$ can be adjusted by monitoring the average transit times through the buffer 122, i.e., the average of $\Delta T$s. To determine the average transit time of packets through the buffer, the $\Delta T$s must be filtered to remove short-term variations. That is, because the packets are jittered, the transit time through the buffer will vary slightly from packet to packet. Since the variation is due to jitter, the system should not change in response to these variations. The average $\Delta T$ after the nth packet can then be determined by:

$$\Delta T_{ave\ n} = LPF(\Delta T_n, \Delta T_{n-1}, \Delta T_{n-2} \ldots \Delta T_k)$$

where,

LPF is a digital low pass filter function (for example, a simple one-pole IIR low pass filter), and the $\Delta T$s are filtered over a range from k to n.

This filter output can then be used to adjust $\alpha$. In the presently preferred embodiment, $\alpha$ is calculated by:

$$\alpha = 1.0 + G(\Delta T_{ave\ n} - \Delta T_{ave\ n-1})$$

where,

G is a gain function determined to provide stability, which can be determined empirically.

As will be described in detail below, $\alpha$ will be used as a multiplier to put the dejitter clock 132 in terms of the encoder clock 117. But, before discussing the various uses of $\alpha$, control of the output rate via rate cell 130 must be introduced and described because the output rate and $\alpha$ are functionally interrelated.

The packets stored in the buffer 122 must be output through output control logic 124. To control the outputting of packets, the RCP 126 must determine the rate at which packets for a given session should be output. The dejitter device 110 treats each session as if the rate is independent of each other session. For example, the rate for packets associated with "Program 1" may be faster or slower than the rate for packets associated with "Program 21." For example, "Program 1" may be transmitted at the nominal rate of 1 Mbit/second; whereas, "Program 21" may be transmitted at 2 Mbit/second, or vice-versa. As a result, the RCP 126 must track a plurality of output rates. This is accomplished, according to the presently preferred embodiment, by the use of a group of rate cells 130. Each session is given a separate cell in the group of rate cells 30 that is set with a count for that session's rate. These rate cells 130 continuously count down and subsequently notify the RCP 126 that a packet should be output for that session. Hence, the rate cells 130 must be initialized with a rate for each session.

According to the presently preferred embodiment, the initial session rate is provided as a part of the provisioning data described above. However, this initial rate reflects the nominal transmission bit rate from the encoder 116 and cannot be relied upon to remain constant for a given session. More likely, the rate will vary as the packets experience variable delays through multiplexing stages, such as at multiplexer 22. Moreover, the rate may contain a small error representing the differences between the encoder clock 117 and the dejitter device local clock 132. As discussed above, the dejitter device local clock 132 cannot be locked to any one encoder clock 117, but rather must remain free-running. Because of the free-running nature of the dejitter device local clock 132, the output rate from the buffer 122 will not be identical to the output rate from the encoder 116. Over a period of time the output rate from the buffer 122 will be a few ticks faster or slower than desired. This error will show up in the transit times through the buffer and will be reflected in $\alpha$. According to the present invention, the values in the rate cells 130 are periodically adjusted to account for this error.

Additionally, as the packets pass through the jitter introducing network 112, the PCRs become corrupted relative to the temporal location of packets. The PCRs must be modified to refer to a clock that is free of jitter. The dejitter device local clock 132 is used for this purpose. As each packet is output from the buffer 122, the PCR is modified to reflect the dejitter clock 132. Initially, the first packet with a PCR that is output from the dejitter device 110 for a session is not modified. This PCR becomes a "seed PCR" for all subsequent PCR bearing packets. Subsequent PCR bearing packets in that session are adjusted relative to the seed PCR based on the local clock 132. Because the seed PCR bearing packet is not changed, its modified PCR (MPCR) is equal to its original PCR. However, all subsequent PCRs must be modified to reflect the new temporal relation with respect to the previous PCR bearing packet, which relation results from the dejittering process. Thus, for a given PCR bearing packet, the PCR must be stamped to be equal to the PCR of the previous packet plus the time that elapsed from when that previous PCR bearing packet left the dejitter device 110 and the time the present packet leaves. Because the time between packet PCRs (now MPCRs) must be in terms of the clock of the encoder 116, the times must additionally be corrected by $\alpha$. In equation form, this MPCR calculation is represented as:

$$MPCR_n = \alpha(DCR(t_{exit\ n}) - DCR(t_{exit\ n-1})) + MPCR_{n-1}$$

where, $DCR(t_{exit\ n})$ is the value of the dejitter device local clock 132 at the time the nth PCR bearing packet was output from buffer 122, $DCR(t_{exit\ n-1})$ is the value of the dejitter device local clock 132 at the time the n-1th PCR bearing packet was output from the buffer 122.

Modifying the PCRs in this way ensures that the temporal location of the packets leaving the buffer 122, and subsequently the dejitter device 110, is correctly reflected by the PCRs. Additionally, the use of $\alpha$ ensures that the modified PCRs track the clock 117 of the encoder 116 that initially generated them.

According to a further aspect of the present invention, small errors in the output rate of packets of a given session can be minimized by comparing the modified PCRs to the original PCRs to determine an error $\epsilon$ and adjusting the output rate accordingly. As illustrated in FIG. 8, the dejitter device 110 attempts to output packets as near as possible to the pre-jitter transmission bit rate. The transmission bit rate, which was initially provisioned into the rate cell 130, should be continuously adjusted to output packets at the pre-jitter variable transmission bit rate as illustrated in FIG. 8. This adjusted transmission bit rate can be determined by calculating the number of clock ticks between PCRs as:

$$\text{clock-ticks} = \frac{PCR_n - PCR_{n-1}}{N_{packets}}$$

Moreover, because the outgoing packets are free of jitter, the number of clock ticks between the modified PCRs in the outgoing session packets should be identical to the number of clock ticks between PCRs in the original Transport Stream. However, the dejitter clock 132, used to clock the rate cells 130, on the dejitter device 110 is not precisely locked to the encoder clock 117. As a result, the packets will be output from the buffer 122 at a slightly different rate than the pre-jitter rate. This rate difference will show up in the number of clock ticks between successive packet exit times, $t_{exit}$. If the dejitter device local clock 132 were locked to the encoder clock 117 then the number of clock ticks between packets would also be equivalent to:

$$\text{clock-ticks} = DCR(t_{exit\ n}) - DCR(t_{exit_{n-1}})$$

where, $DCR(t_{exit})$ represents the count of the dejitter clock 132 when the packet exited the buffer.

But, the clocks are not locked, and thus there is a small error $\epsilon$ between the PCRs and $DCRS(t_{exit})$. As a result, the output of packets from the dejitter device 110 does not exactly track the pre-jitter rate, as illustrated in FIG. 10. That error is represented by the equation:

$$\epsilon = MPCR_n - PCR_n$$

Taking this error into account yields:

$$\text{clock-ticks} = \frac{(PCR_n - PCR_{n-1}) - \epsilon}{N_{packets}}$$

This new calculated clock tick value is loaded into the rate cell 130. Packets are subsequently output at the new rate, which more closely tracks the pre-jitter transmission bit rate. This rate must be continuously adjusted to track the pre-jitter transmission bit rate because that rate is a variable bit rate that continuously changes as illustrated in FIG. 8. This continuous adjustment assures that the error between the MPCRs and the original PCRs in the Transport Stream is minimized. Significantly, the MPCR is corrected by $\alpha$. And the rate error $\epsilon$ is equal to the MPCR minus the PCR. Thus when the new rate is adjusted by $\epsilon$ and loaded into the rate cell 130, the new rate will have an $\alpha$ component. As a result, the rate cell 130, clocked by the free-running local clock 132, is compensated for $\alpha$. This $\alpha$ compensation works to keep the average transit time of packets through the buffer constant.

Figure 11:
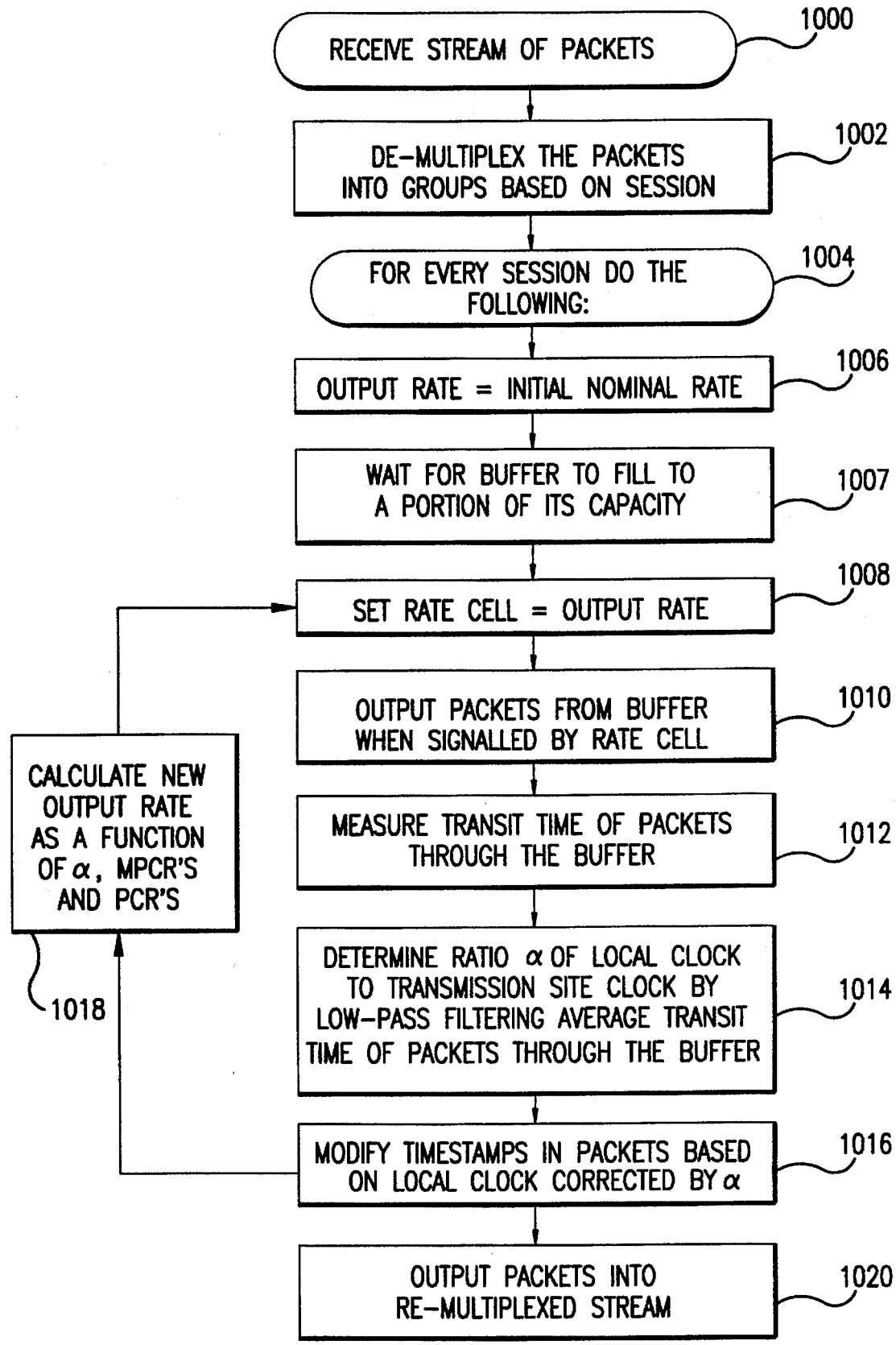
FIG. 11 presents a flow chart of the process of dejittering packets.

FIG. 11 is a flow chart illustrating the operation of the dejitter device and preferred embodiment of the method of the present invention. First, at step 1000, a stream of packets is received by the dejitter device 110. According to the presently preferred embodiment of the present invention, the packets received conform to the MPEG-2 Systems standard, and thus bear timestamps (PCRs) reflecting the value of the transmission system (i.e., encoder) clock. Moreover, the packets contain PIDs indicating the packets that together form an elementary stream. At step 1002, the packets are de-multiplexed into sessions. As discussed above, each session is defined by a group of PIDs. The packets having PIDs of a given session are stored in the buffer 122 with other packets from that session. As indicted by step 1004, the packets are then dejittered on a per session basis as the remaining steps are performed substantially simultaneously for each session. Thus, the steps discussed below apply to all sessions.

At step 1007, to prevent buffer underflow, the dejitter process must wait for the buffer for this session to begin to fill to some portion of its capacity (e.g., 50 percent). When the buffer has filled to the desired level, then, at step 1008, the rate cell 130 for a given session is loaded with an output rate value. In the first iteration, the output rate is set to a nominal value that is provided to the dejitter device 110 (step 1006). This nominal transmission bit rate is then loaded into the rate cell 130 at step 1008. Next, at step 1010, the packets of the session at the rate indicated by the value in the rate cell 130. That is, each time the rate cell 130 counts down from the value loaded into its register, it signals the LLMP 128 to output a packet from the buffer. As indicated in step 1012, as packets pass through the buffer, the transit time of each packet through the buffer is measured. This measurement is obtained by taking two snapshots of the local clock 132 value, once when a packet enters the buffer, and again when the packet exits the buffer. The transit time of a packet through the buffer is obtained by subtracting its entrance time from its exit time. As indicated by step 1014, the measured transit times of packets through the buffer are used to determine a ratio, $\alpha$, of encoder clock 117 frequency relative to local clock 132 frequency. As described in detail above, α is a function of the average transit times of packets through the buffer, and is used to adjust the output rate of packets from the buffer so as to maintain a substantially constant average transit time of packets through the buffer.

Next, in step 1016, a modified PCR (MPCR) replaces the original PCR in PCR bearing packets. The MPCR (step 1018) is a function of the local clock 132 corrected by α and is described in detail above. The MPCR is an adjustment to the original PCR in a packet to reflect any changes in the temporal relationship of that packet to a preceding PCR bearing packet that results from the controlled output of packets through the buffer.

Represented by step 1020, the packets are output from the dejitter device 110 and a new stream of dejittered packets is formed. As indicated in step 1018 and as described more fully above, the output rate is adjusted as a function of α and an error difference, ε, between the original PCRs of each packet and the MPCRs that are inserted into the packets as they exit the buffer. The new rate is then loaded into the rate cell 130 and the process loops continuously until all packets have been dejittered.

Figure 12:
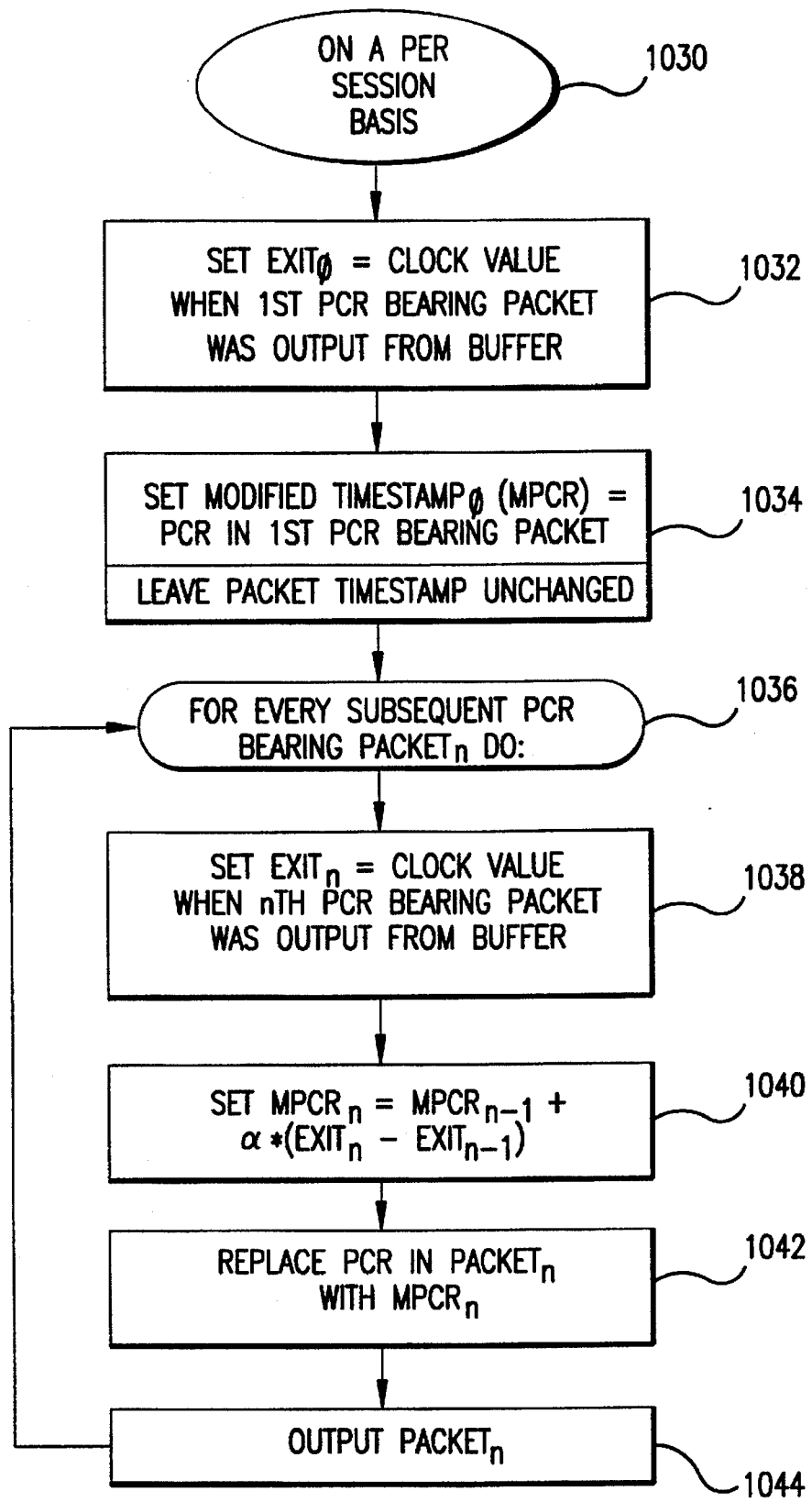
FIG. 12 presents a flow chart of the process of replacing the timestamps in selected packets.

FIG. 12, is a flow chart illustrating further details of step 1016 of FIG. 11, i.e., the process of modifying the PCRs in the PCR bearing packets. As noted by step 1030, this PCR modification process is performed on a per session basis. Initially, at steps 1032 and 1034, an exit value is obtained for the first PCR bearing packet that leaves the buffer. This value becomes $exit_0$. Because the first PCR bearing packet becomes the seed for planting new PCRs in all the subsequent PCR bearing packets, the MPCR for this packet remains unchanged from the original PCR value. Consequently, $MPCR_0$ is equal to $PCR_0$.

As indicated by step 1036, the following steps 1038 through 1044 are performed on all subsequent PCR bearing packets. First, at step 1038, an exit value, $exit_n$, is obtained for the nth PCR bearing packet as it exits the buffer. Second, at step 1040, an MPCR is determined for this nth packet according to $MPCR_n = MPCR_{n-1} + \alpha*(exit_n - exit_{n-1})$. For example, the second PCR bearing packet has a MPCR equal to $MPCR_0$ plus α multiplied by the difference between the time the packet was output from the buffer and the time when the first packet was output. The MPCR of a packet reflects the time that packet exited from the buffer relative to the time that the previous packet exited from the buffer. At step 1042, the original PCR of the packet is replaced by the MPCR. The packet is then output at step 1044. The process loops back to step 1036 and begins again for each subsequent PCR bearing packet.

Thus, in accordance with the above described methods and apparatus of the present invention, the overall result of the dejitter device 110 is to restore the Transport Stream as closely as possible to its condition prior to entering the jitter introducing network 112. Some jitter may nevertheless remain; however, this remaining jitter is accommodated by modifying the original timestamps to reflect the remaining jitter.

As the foregoing illustrates, the present invention is directed to a method and apparatus for dejittering packets that have encountered uncorrected variable delay or jitter. It is understood, however, that changes may be made to the embodiments described above without departing from the broad inventive concepts thereof. Accordingly, this invention is not limited to the particular embodiments disclosed, but is intended to cover all modifications that are within the scope and spirit of the invention as defined by the appended claims.

What is claimed is:

1. In a system for transmitting packets of information from a transmission site to a reception site at a transmission bit rate, wherein timestamp values are inserted into selected packets prior to transmission that represent the value of a transmission site clock, and further wherein the packets experience jitter during transmission, a method of substantially removing jitter and adjusting the timestamp values prior to reception at the reception site, said method comprising the steps of:

(a) receiving the packets at an intermediate site having a local clock that operates at a nominal frequency substantially equal to the nominal frequency of the transmission site clock;

(b) storing the received packets in a buffer at said intermediate site;

(c) outputting the packets from said buffer at an initial nominal rate for reception at the reception site;

(d) measuring an average transit time of packets through said buffer;

(e) adjusting said rate at which packets are output from the buffer to maintain a substantially constant average transit time of packets through the buffer; and, (f) modifying the timestamps of said selected packets to reflect changes in temporal relationship between packets due to said adjusted rate of output thereof.

2. The method of claim 1 further comprising the steps of:

(i) after the step of receiving the packets at an intermediate site, de-multiplexing the packets into separate groups of packets, each said separate group defining a session;

(ii) performing steps (b) through (f) on the packets of each session independently, the packets being output from said buffer in a re-multiplexed form.

3. The method of claim 1 wherein the step of adjusting the rate at which packets are output from the buffer comprises the steps of:

(i) low-pass filtering values representing the average transit times of successive packets through the buffer to produce a measure of the ratio of local clock frequency to transmission site clock frequency that is free from jitter;

(ii) determining a value α based on said low pass filtering of the average transit time of successive packets through said buffer, which represents the ratio of the frequency of the transmission site clock to the frequency of said local clock; and, (ii) periodically adjusting the output rate based on α.

4. The method of claim 3 wherein the step of determining the value α further comprises the steps of:

initializing α to a predetermined value substantially equal to the ratio of the nominal frequency of the transmission site clock to the nominal frequency of the local clock; and, periodically adjusting α based on changes in the low-pass filtered values.

5. The method of claim 3 further comprising the step of adjusting the output rate based on the timestamps contained in said selected packets when said packets were received at the intermediate site.

6. The method of claim 1 wherein the step of modifying the timestamps of said selected packets comprises the steps of:

(i) setting the value of a first modified timestamp to the timestamp value contained in a first packet containing a timestamp;

(ii) recording a first value of said local clock, $DCR_1(t_{exit})$, when the first packet containing a timestamp is output from said buffer;

(iii) recording a second value of said local clock, $DCR_2(t_{exit})$, when the second packet containing a timestamp to be modified is output from said buffer;

(iv) calculating a second modified timestamp; wherein said second modified timestamp is equal to the first modified timestamp $+\alpha*(DCR_2(t_{exit})-DCR_1(t_{exit}))$;

(v) after calculating said second modified timestamp, replacing the value of the timestamp in said second packet with the value of said second modified timestamp;

(vi) setting the value of said first modified timestamp to the value of said second modified timestamp and said first value of said local clock to said second value of said local clock, $DCR_2(t_{exit})$; and, (vii) repeating steps (iii) to (vi) for all subsequent packets containing a timestamp.

7. The method of claim 6 further comprising the step of periodically further adjusting the rate at which packets are output from said buffer based on a comparison of the value of the timestamp in said second packet to the value of said second modified timestamp as steps (iii) to (vi) are repeated for subsequent packets.

8. In a system for transmitting packets of information from a transmission site to a reception site at a transmission bit rate, wherein timestamp values are inserted into selected packets prior to transmission that represent the value of a transmission site clock, and further wherein the packet may experience jitter during transmission, an apparatus for substantially removing packet jitter and adjusting packet timestamp values to synchronize the reception site clock to the transmission site clock, said apparatus comprising:

a local clock;

means for receiving the packets;

a buffer for storing the received packets;

means for outputting the packets from said buffer at an initial transmission bit rate for reception at the reception site;

means cooperating with said local clock for measuring average transit times of packets through said buffer;

means cooperating with said means for measuring transit times for adjusting the rate at which packets are output from said buffer to maintain a substantially constant average transit time of packets through the buffer; and, means for modifying the timestamps of said selected packets to reflect changes in temporal relationship between packets due to said adjusted rate of output thereof.

9. An apparatus as in claim 8 wherein the means for adjusting the output rate comprises:

filter means cooperating with said buffer for filtering a plurality of average transit times of packets through the buffer; and, a processor cooperating with said filter means adding successive values emerging from said digital filter means; multiplying the added values by a gain factor to produce a signal representing the ratio of local clock frequency to transmission site clock frequency; and, adjusting the output rate based on said signal so that the average time of packets through said buffer remains substantially constant.

10. The apparatus of claim 8 wherein the means for outputting the packets comprises:

a rate cell cooperating with said local clock that is loaded with a value representing the rate at which packets should be output from said buffer, said rate cell continuously counting down from said loaded value to zero and providing a signal that a packet should be output from said buffer each time a zero count is reached;

a processor responsive to the signal from said rate cell for outputting a packet from said buffer when the rate cell provides the signal that it has reached zero; and, output control logic that communicates with said processor for outputting a packet to the reception site.

* * * * *